(12) United States Patent
Isom

(10) Patent No.: US 8,122,426 B2
(45) Date of Patent: Feb. 21, 2012

(54) GOVERNANCE FRAMEWORK FOR ARCHITECTURE DESIGN IN A SERVICE ORIENTED ENTERPRISE

(75) Inventor: Pamela K. Isom, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 11/846,640

(22) Filed: Aug. 29, 2007

(65) Prior Publication Data

US 2009/0064087 A1    Mar. 5, 2009

(51) Int. Cl.
*G06F 9/44* (2006.01)

(52) U.S. Cl. ........ 717/103; 717/102; 717/107; 717/108; 717/109; 717/111

(58) Field of Classification Search .......... None
See application file for complete search history.

(56) References Cited

U.S. PATENT DOCUMENTS

| | | | |
|---|---|---|---|
| 2003/0135399 | A1 | 7/2003 | Ahamparam et al. |
| 2004/0193703 | A1* | 9/2004 | Loewy et al. ............... 709/220 |
| 2006/0235733 | A1* | 10/2006 | Marks ........................... 705/7 |
| 2006/0271660 | A1 | 11/2006 | LaJeunesse |
| 2007/0022404 | A1 | 1/2007 | Zhang et al. |
| 2007/0094063 | A1 | 4/2007 | Skibinski |

* cited by examiner

*Primary Examiner* — Chuck Kendall

(74) *Attorney, Agent, or Firm* — Yudell Isidore Ng Russell PLLC

(57) ABSTRACT

A reusable framework is utilized for creating a software architecture in a Service Oriented Architecture (SOA). After a general framework is created, that general framework is divided into a governance domain and an architecture domain. The architecture domain is further divided into architecture sub-domains within the architecture domain. Activities that are required for the governance domain and each of the architecture sub-domains and identified and described in detail, and owners and progress status markers for these activities are identified. The detailed descriptors of the activities, identified owners and progress status markers are then mapped onto a client-specific System Development Life Cycle (SDLC) work product to create an SOA-based software architecture. Deployment timelines for the governance domain and the architecture domain are determined, and a project plan for deploying the SOA-based software architecture is created.

20 Claims, 18 Drawing Sheets

PROJECT-X
Architecture Governance Sub-domain
(Work Products and/or Key SOE Activities)

202

| Activity | Owner and Status | Description | Work Product Mapping |
|---|---|---|---|
| Governance Entry Points | Pam 100% Complete | Define governance entry points – current and to-be state for PROJECT-X | Company X SOA and Vision Document |
| Create Governance Method | Pam 100% Complete | IBM's Governance Method was chosen – (Plan, define, enable, measure) | IBM Governance and Management Method |
| Define Service Method for PROJECT-X | Pam 100% Complete | Need a method to identify, specify, realize services | SOMA |
| Create Governance Framework | Pam 100% Complete | Defines the governance foundation – goes deeper than the method and identifies activities per architecture domain, also includes design of centers of excellence per domain | Joint Client and IBM deliverable |
| Determine Maturity Levels for SOA | Pam 100% Complete | Determine organizational readiness for SOA - Derive Current and Future State and activities for maturing the organization | SIMM Assessment, Joint Client and IBM Work Products |
| Create Service Design & Development Guidelines and Best Practices | Pam 100% Complete | Service design and development best practices | TBD |
| Create Architecture Decisions document | Pam 100% Complete | Architecture Decisions document and framework for capture | IBM Architecture Decisions Document |
| Create Non-Functional Requirements Document | Pam 100% complete | Non-Functional Requirements Document and framework for capture | IBM NFR Document |

*Figure 2*

PROJECT-X
Architecture Presentation Sub-Domain
(Architecture Work Products and/or Key SOE Activities)

302A 

| Activity | Owner and Status | Description | Work Product Mapping |
|---|---|---|---|
| Derive Portal Requirements | Stan 100% complete | | |
| Conduct Portal Architecture Assessment | Stan 100% complete | | |
| Create Portal Architecture Definition | Stan 100% complete | Define key portal components for ProjectX for interim and longer term. | Client X Solution and Technical Design Document |
| Create ProjectX Portal Transition Plans | Stan 50% complete | | IBM Transition Plan and Roadmap |
| Create Enterprise Portal Best Practices & Key competencies | Stan 100% complete | | |
| Create Presentation Design Standards and Guidelines | Stan Not started | Decide on standard presentation application framework e.g. JSP, Servlet, Struts, MVC, JSR168, WSRP portlet and device access guidelines, document and review with the team. | |
| Create Content Management Plan | George Not started | | CM Integration guidelines may center on ProjectX initially.\n\nIncludes Integration, deployment and publishing guidelines.\n\nAlso see information architecture sections |
| Conduct UI Roles to LDAP Mapping – Security Architect and Portal Architect should collaborate - TBD | Stan, Security Architect, Portal Architect Not started | Create LDAP schema and security model to support user roles, responsibilities and permissions | Part of security requirements |

*Figure 3A*

PROJECT-X
Architecture Presentation Sub-Domain
(Architecture Work Products and/or Key SOE Activities)

302B

| | | | |
|---|---|---|---|
| Define Usability Requirements | Elizabeth 100% Complete | | What are the usability requirements for ProjectX e.g. dashboards, thin client, no widgets, device support, browser support, color schemes? |
| Create Usability prototype, wireframes | Elizabeth 25% Complete | | Design User Dashboards and navigation, show information exchange |
| Prepare Usability Design Standards | Elizabeth 100% Complete | These are UI design standards – for example use cascading style sheets, amount of fields to a portlet frame, etc. | Create guidelines for other usability designers |
| Create Enterprise Content Management Usage Guidelines | Elizabeth 100% Complete | Provide guidelines on how to use the ECM tool and standards as part of the overall UI designs | |
| Create User Profiles (UI Role Definition and Responsibilities) | Elizabeth Not started | Identify key roles, responsibilities and permissions – for instance Participants should only be allowed to see their own investment portfolio's where administrators should be able to see many investor portfolios with limited permissions | User Profiles & Update User Scenarios<br><br>UI lead should collaborate with security and portal architect |
| Update Architecture Decisions | ongoing | | Architecture Decisions Document |
| Update Non-Functional Requirements | ongoing | | Non-Functional Requirements Document |

*Figure 3B*

PROJECT-X
Architecture Business Sub-Domain
(Architecture Work Products and/or Key SOE Activities)

402 

| Activity | Owner and Status | Description | Work Product Mapping |
|---|---|---|---|
| Complete Business, Functional Requirements & Use Cases | | | Client X BRD and FDD<br>IBM Use Case Model |
| Capture User Metrics | | | |
| Create User Scenarios | | | IBM User Scenarios |
| Conduct Business Rules Identification and Catalog | | | Client X Business Rules Catalog |
| Complete Business Architecture Assessment (optional) | | | |
| Create Business Model & Domains | | | IBM Business Model |
| Prepare Business Process Modeling Guidelines and Best Practices (optional) | | | |
| Conduct Business Process Decomposition – (Process Models and Maps) | | | |
| * Candidate Business Service Identification | | | |
| Update Architecture Decisions | | | |
| Update Non-Functional Requirements | | | |

*Dependent on to-be business process models and functional designs

*Figure 4*

PROJECT-X
Architecture Application Sub-Domain
(Architecture Work Products and/or Key SOE Activities)

502A

| Activity | Owner and Status | Description | Work Product Mapping |
|---|---|---|---|
| Prepare System Context Diagram | Pam<br>100% complete | Shows external interfaces to the new web solution | IBM System Context |
| Determine Application Architecture Requirements | 0% complete<br>TBD | | Client X BRD and FDD |
| Select tools and software packages | TBD | Vendor product evaluation and selections – make build vs buy decisions for solutions | Example – open source frameworks for ProjectX such as Logging and error handling |
| Create High Level Architecture Overview Diagrams | Pam<br>100% complete | | Architecture overview |
| Prepare ESB Requirements and High Level Design | Pam<br>Lee<br>60% complete | | Architecture overview - ESB |
| Document Interim Application Architecture | 0% complete<br>TBD | Supports enhancement of the applications and eases future migration to the portal – includes application frameworks | Client X - Architecture Model |
| Create Service Portfolio Definition and Design (SOMA) | Pam<br>90% complete | | IBM Service Model |
| Conduct Application Portfolio Assessment | Pam<br>100% complete | | Application Inventory and Usage Assessment (portal focus) |
| Conduct SOA and Maturity Level Assessment | Pam<br>100% complete | SIMM, SOA Assessment Report and Recommendations | Recommend quarterly assessments as ProjectX progresses<br><br>SIMM deep-dive planned |

\* Dependent on to-be business process models and functional designs

*Figure 5A*

PROJECT-X 502B
Architecture Application Sub-Domain
(Architecture Work Products and/or Key SOE Activities)

| | | | |
|---|---|---|---|
| * Conduct Candidate IT Service Identification | | | *IBM Service Model |
| *Account | Pam 20% complete | | *IBM Service Model |
| *Other | Not started Owner? | | *IBM Service Model |
| *Finalize IT Service Identification | 0% Complete Owner? | Apply service litmus test – exposure decisions | *IBM Service Model |
| Conduct Existing Asset Analysis – Legacy to SOA | Lee 20% complete | Review existing applications – determine if can be used by ProjectX and what changes – if any – need to occur to support the new architecture | IBM Service Model |
| Create Final Application Architecture | TBD | Longer term application architecture | IBM Architecture Overview - Application |
| Create Application Component Models | TBD | | IBM Component Model - Application |
| Create Technology Specific Use Cases | TBD | Examples – error handling, logging usage scenarios and cases. | |
| Conduct Service Specification Activities | TBD | | IBM Service Model, IBM Component Model |
| Prepare design and development standards | TBD | | Client X Standards Template |
| Update Architecture Decisions | ongoing | | IBM Architecture Decisions Document |
| Update Non-Functional Requirements | ongoing | | IBM Non Functional Requirements Document |

* Dependent on to-be business process models and functional designs

*Figure 5B*

PROJECT-X
Architecture Information Sub-Domain
(Architecture Work Products and/or Key SOE Activities)

602

| Activity | Owner and Status | Description | Work Product Mapping |
|---|---|---|---|
| Information Architecture Assessment | George | Information Asset Profile and Security evaluation. | |
| Prepare Information Models and availability needs (example – recommend replication processes) | George | Enterprise or ProjectX Information Model (relationship and flows, replication and availability). Architecture Overview – IA | |
| Define Content Management – topology and standards | George | Document content management topology – to-be state since existing CM does not exist. Architecture Overview – IA Component Model – IA | |
| Review/Update User Metrics | George | KPI's, ROI/TCO, service level agreements, business goals | |
| Define business intelligence architecture and access components | George | Define and/or ensure architecture is in place to provide information as a service (e.g. trending, analytics, reporting, necessary intelligence and constraints). Architecture Overview – IA Component Model – IA | |
| Define and Implement business rules taxonomy and rules engine interfaces | George | Using the business rules catalog defined by the business analyst, create rules engine interface and taxonomy, determine externalization criteria and enforce. BR Catalog. | |
| QA/Validate Process Flow Diagrams | George | Process Models Ensure processes are accurate, security issues incorporated, service composition valid, etc. | |
| Update Architecture Decisions | George | Architecture decisions framework and capture | IBM Architecture Decisions Document |
| Update Non-Functional Requirements | George | Non-functional requirements framework and capture | IBM Non-Functional Requirements Document |

*Figure 6*

PROJECT-X
Architecture Data Sub-Domain
(Architecture Work Products and/or Key SOE Activities)

702 

| Activity | Owner and Status | Description | Work Product Mapping |
|---|---|---|---|
| Conduct Data Architecture Assessment | Olivette | Review existing data models, databases and environment. Determine current and to-be state. Make recommendations such as build vs buy and product recommendations, optimization techniques, etc. | |
| Capture Data Architecture Requirements | Olivette | Document data architecture needs for to-be state. Document and advise on database performance, tuning and measurement requirements and determine service level agreements. | |
| Create Data Governance and Access Guidelines | Olivette | Set overarching Data Governance, metadata strategy, data and function access criteria. Determine and document performance and data access patterns. | |
| Create Data Flow Diagrams | Olivette | Can be part of logical data modeling – shows data flow and entity relationships. | |
| Create Data Models – logical | Olivette | Data models should specify entities, attributes and relationships between the data.<br><br>Assist the database administrator with the translation of the logical model into a workable physical model. | |
| Data Services – Specification and realization decisions | Olivette | Research, document and publish data services that will support service requests and address consumer needs. | |
| Create Physical Database and Implement | TBD | Conducted by the DBA – leverages logical data models as inputs. | |
| Participate in ESB Design Reviews | Olivette | Contribute to ESB designs – ensure that respective data services are consumed via the ESB appropriately. | |
| Design data warehouse and data mart structures | Olivette | Define and document data warehouse and data mart structures. | |
| Update Architecture Decisions | On-going | Architecture decisions. | |
| Update Non-Functional Requirements | On-going | Non functional requirements. | |

*Figure 7*

PROJECT-X
Architecture Integration Sub-Domain
(Architecture Work Products and/or Key SOE Activities)

802

| Activity | Owner and Status | Description | Work Product Mapping |
|---|---|---|---|
| Conduct Integration Architecture Assessment | TBD | To determine to-be state and necessary actions | |
| *Review/Define Integration Architecture Requirements (refer to example standards below) | TBD | *Identify necessary middleware integration components and requirements to support ProjectX | |
| Maintain System context diagram | TBD | As interfaces – internal and external change for ProjectX | |
| *Create Integration Guiding Principles, Standards and design patterns (refer to example standards below) | TBD | *Standards – Guidelines on how to use the EAI components? When is ESB used and how? How do we ensure that specific ESB provider components are transparent from the ProjectX consumer? | |
| Conduct ESB Component Design | TBD | Component Model – ESB<br><br>Identify ESB components and how to use – map back to ProjectX requirements (functional and non-functional) | |
| Define Transaction Maps – Messaging, ETL, Batch | TBD | Document transactions, messages, requests, and responses | |
| Service Specification – Create Integration Services Designs and realization decisions | TBD | Detailed Service Component Design and Realization decisions | |
| Define Legacy Transformation Services | TBD | Legacy component adapters and access services | |
| Define Data Transformation Services | TBD | Services to transform data as required by consumers | |
| Update Architecture Decisions | ongoing | Architecture Decisions Document | |
| Update Non-Functional Requirements | ongoing | Non Functional Requirements Document | |

*Figure 8*

PROJECT-X
Architecture System Sub-Domain
(Architecture Work Products and/or Key SOE Activities)

1002 

| Activity | Owner and Status | Description / Comments | Work Product Mapping |
|---|---|---|---|
| Create Operational Model | Lee | Operational Model | |
| Define Infrastructure (Hardware and Software Definition) | Lee | Operational Model, Architecture Overview, Identify SOA Management and Monitoring Services | |
| Review and Define Network Strategy | Network Administrator – TBD | Network Topology Diagrams – Determine if existing network will handle projected traffic and support the new webs solutions – make appropriate recommendations | |
| Complete Infrastructure Portfolio Assessment and Requirements | Lee | To determine infrastructure current and to-be state | |
| Create Performance Plan and Model | Lee | Performance Model – to ensure designs are taking into account performance requirements when designed, also identify and implement performance tools | |
| Update Architecture Decisions | Lee | Architecture Decisions Document | |
| Update Non-Functional Requirements | Lee | Non-Functional Requirements Document | |

| Domain | Implementation Date | Comments |
|---|---|---|
| Overall Governance | 3Q06 | |
| Presentation Layer | 1Q07 | |
| *Business Architecture | start with Accounts (4Q06 – 2Q07) | |
| Application Architecture | Interim 4Q06 – very early 1Q07, End State – 3Q07<br><br>Application Services Identified for Accounts – 4Q06, all other business domains 3Q07 | |
| Information Architecture | 1Q07 | |
| Data Architecture | Accounts – 4Q06, all other business domains 4Q07 | |
| Integration Architecture | 1Q07 - 3Q07 | |
| Integration Services | 2Q07 - 4Q07 | Service realization – middleware services, includes ETL and batch. |
| Security | 2Q07 - 1Q08 | Question to the team: – What's the right timing given SSO and physical environment changes? |
| Systems Management Architecture | define 4Q06, implement in 1Q07 – 2Q07 | |

*Figure 11*

GOVERNANCE FRAMEWORK FOR ARCHITECTURE DESIGN IN A SERVICE ORIENTED ENTERPRISE

BACKGROUND OF THE INVENTION

1. Technical Field

The present disclosure relates to the field of computers, and specifically the software that runs on computers. Still more particularly, the present disclosure relates to the field of architecture design.

2. Description of the Related Art

A highly efficient use of software is through a Service-Oriented Architecture (SOA). SOA is a collection of software services that are provided to a customer. Unlike previous generations of distributed computing systems, SOA provides a level of granularity that allows the customer to achieve near-custom software, while reusing existing services that are supplied to the SOA services provider. However, transitioning from a local architecture to an SOA architecture is fraught with transition problems.

SUMMARY OF THE INVENTION

A reusable framework is utilized for creating a software architecture in a Service Oriented Architecture (SOA). After a general framework is created, that general framework is divided into a governance domain and an architecture domain. The architecture domain is further divided into architecture sub-domains within the architecture domain. Activities that are required for the governance domain and each of the architecture sub-domains identified are described in detail, and owners and progress status markers for these activities are identified. The detailed descriptors of the activities, identified owners and progress status markers are then mapped onto a client-specific System Development Life Cycle (SDLC) work product to create an SOA-based software architecture. Deployment timelines for the governance domain and the architecture domain are determined, and a project plan for deploying the SOA-based software architecture is created.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 depicts an exemplary architecture governance sub-domain;

FIGS. 3A-B depict an exemplary architecture presentation sub-domain;

FIG. 4 depicts an exemplary architecture business sub-domain;

FIGS. 5A-B depicts an exemplary architecture application sub-domain;

FIG. 6 depicts an exemplary architecture information sub-domain;

FIG. 7 depicts an exemplary architecture data sub-domain;

FIG. 8 depicts an exemplary architecture integration sub-domain;

FIG. 10 depicts an alternative synoptic description of exemplary activities used to create and implement an architecture framework;

FIG. 11 illustrates additional detail for determining deployment and development timelines for the governance domain and the architecture domain of the reusable architecture framework;

DETAILED DESCRIPTION OF THE PREFERRED EMBODIMENT

Figure 1:
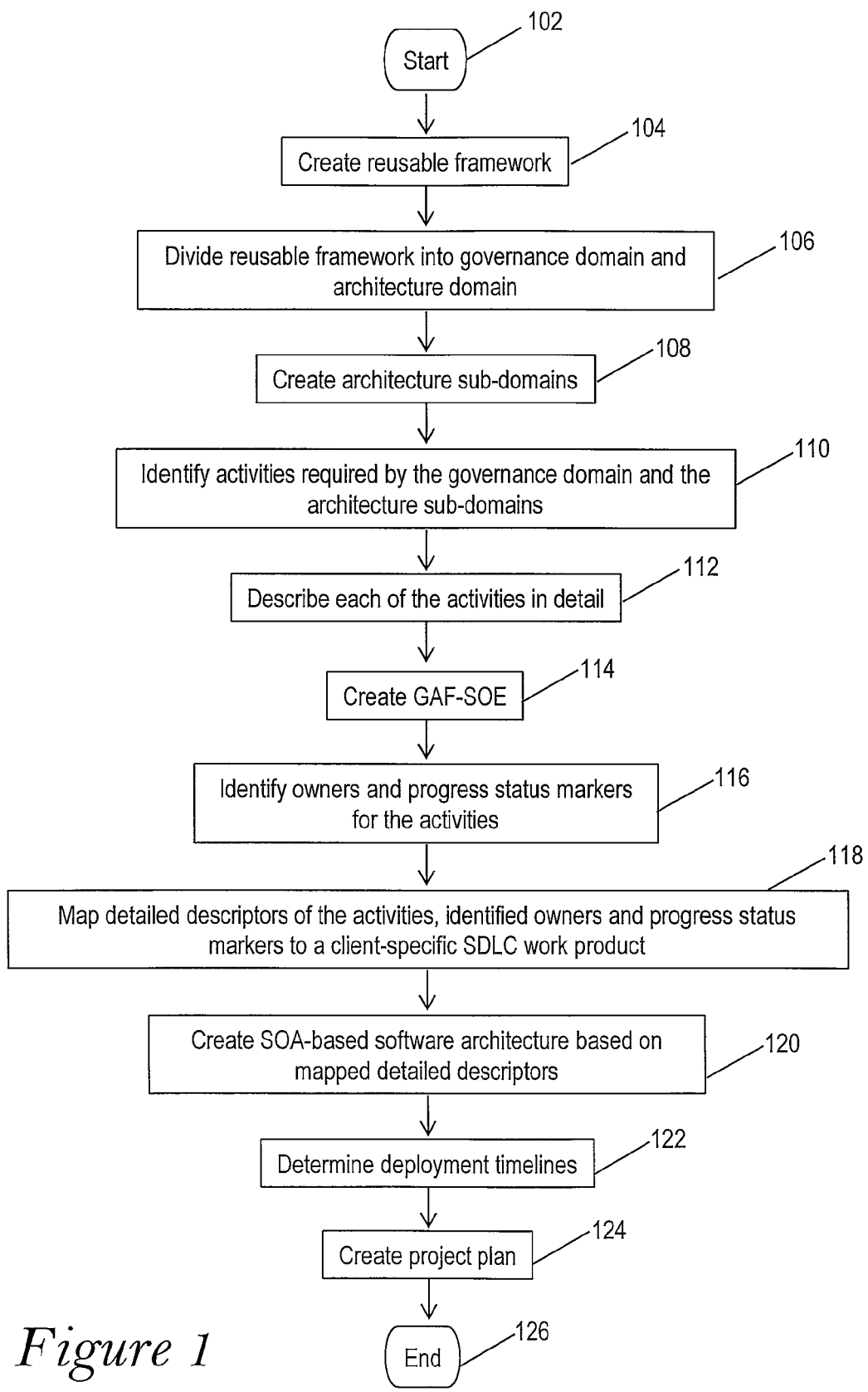
FIG. 1 is a high-level flow chart of exemplary steps taken to create and utilize a reusable architecture framework that includes a governance domain and an architecture domain, wherein the architecture domain is partitioned into multiple architecture sub-domains.

With reference now to the figures, and particular to FIG. 1, a high-level flow chart of exemplary steps taken to create and utilize a Governance/Architecture Framework in a Service Oriented Environment (GAF-SOE) is presented. After initiator block 102, which may be prompted by a decision by a Service Oriented Architecture (SOA) provider to create a reusable framework for a new type of software architecture, a basic reusable framework for a software architecture is created (block 104). Preferably, this software architecture is for a SOA environment. The newly created framework is then divided into two domains: the governance domain and the architecture domain (block 106). The governance domain defines principals and policies for designing and implementing a new software architecture. Examples of such principals and policies include, but are not limited to, legal requirements that must be met by the new software architecture (e.g., compliance with laws such as Sarbanes-Oxley), general requirements (software and hardware) of the new software architecture, general and specific goals and purposes of the new software architecture, etc. That is, the governance domain is a general "way of thinking" about the software and human responsibilities, and what should be accomplished for an enterprise. The architecture domain describes specific elements and requirements for the new software architecture. Since the architecture domain is much more specific and task-directed, the architecture domain is subdivided into multiple architecture sub-domains (block 108). In a preferred embodiment, there are nine architecture sub-domains: governance (for defining principals and policies for the following eight sub-domains), presentation, business, application, information, data, integration, security and system.

Architecture Governance Sub-Domain

The architecture governance sub-domain defines enterprise and/or project level principles (e.g., global solutioning guiding principles for different legal practices and customs of different countries), policies (e.g., enterprise security policies), and/or guidelines (e.g., project specific security implementation guidelines). As shown in FIG. 2, a chart 202 depicts exemplary details found in architecture governance sub-domain activities for a "Project X." The work products and/or key activities associated with the architecture governance sub-domain include, but are not limited to, governance entry points; methods to create governance policies; defining the service method; creating a governance framework; determining maturity levels in an SOA; creating service design and development guidelines and best practices; creating architecture decision document; and creating non-functional requirements documents. Note also that the chart 202, as well as the rest of the charts depicted in the following figures, identifies which owner (e.g., Pam) is responsible for the particular activity described in detail in the chart 202, and describes the completion status for each activity.

Architecture Presentation Sub-Domain

The architecture presentation sub-domain identifies which architectural structures and elements are necessary for presenting data to a user (e.g., via a particular hardware device such as a Personal Digital Assistant (PDA), and via a particular type of Graphical User Interface (GUI)). As shown in the chart 302 depicted in FIGS. 3A-B, exemplary architecture presentation sub-domain activities and/or work products include, but are not limited to, deriving portal requirements; conducting portal architecture assessments; creating portal architecture definitions; creating portal transition plans; creating enterprise portal best practices and key competencies; creating presentation design standards and guidelines; creating content management plans; conducting User Interface roles to Lightweight Directory Access Protocol (LDAP) mapping (including assuring that the security architect and portal architect are in collaboration); defining usability requirements; creating usability prototype frameworks; preparing usability design standards; creating enterprise content management usage guidelines; creating user profiles; updating architecture decisions; and updating non-functional requirements.

Architecture Business Sub-Domain

The architecture business sub-domain defines architecture structures, elements and/or activities needed to identify and capture business processes (e.g., electronic payments) and functionality. That is, the architecture business sub-domain deals with business rules, which define how different enterprise services and processes are performed. As depicted in chart 402 in FIG. 4, exemplary work products and/or activities associated with the architecture business sub-domain include, but are not limited to, completing business functional requirements and use cases; capturing user metrics; creating user scenarios; conducting business rules, identification and catalogs; completing business architecture assessments; creating a business model and domains; preparing business process modeling guidelines and best practices; conducting business process decomposition; identifying candidate business services; updating architecture decisions; and updating non-functional requirements.

Architecture Application Sub-Domain

The architecture application sub-domain defines architecture structures, elements and/or activities needed to define and support specific applications. For example, the architecture application sub-domain may define how a portal server is used for a portal, if a software such as SAP is to be utilized, how a web server and an application server exchange application programs, etc. As depicted in chart 502 in FIGS. 5A-B, exemplary work products and/or activities associated with the architecture application sub-domain include, but are not limited to preparing system context diagrams; determining application architecture requirements; selecting tools and software packages; creating high level architecture overview diagrams; preparing Enterprise Service Bus (ESB) requirements and high level design; documenting interim application architectures; creating service portfolio definition and design; conducting application portfolio assessments; conducting SOA and maturity level assessments; conducting candidate IT service identifications; finalizing Information Technology (IT) service identification; conducting an existing asset analysis for a legacy to SOA; creating a final application architecture; creating application component models; creating technology specific use cases; conducting service specification activities; preparing design and development standards; updating architecture decisions; and updating non-function requirements.

Architecture Information Sub-Domain

The architecture information sub-domain defines architecture structures, elements and/or activities needed to ensure that data is relevant and meaningful "information" for a consumer. That is, data is simply numbers and words. Information, however, is relevant and meaningful data, which is interrogated and derived for the end-user or consumer. As shown in chart 602 in FIG. 6, exemplary architecture work products and/or key SOE activities for the architecture information sub-domain include, but are not limited to, information architecture assessment; preparing information models and availability needs; defining content management; reviewing/updating user metrics; defining business intelligence architecture and access components; defining and implementing business rules taxonomy and rule engine interfaces; quality assurance and validation of process flow diagrams updating architecture decisions; and updating non-functional requirements.

Architecture Data Sub-Domain

The architecture data sub-domain defines architecture structures, elements and/or activities needed to support management of data and related services. For example, a particular project may utilize an LDAP tree system to manage files. As shown in chart 702 of FIG. 7, exemplary architecture work products and/or key SOE activities for the architecture data sub-domain include, but are not limited to, conducting data architecture assessments; capturing data architecture requirements; creating data governance and access guidelines; creating data flow diagrams; creating logical data models; creating specifications and realization decisions for data services; creating physical databases and implementing same; designing data warehouses and data mart structures; updating architecture decisions; and updating non-functional requirements.

Architecture Integration Sub-Domain

The architecture integration sub-domain defines architecture structures, elements and/or activities needed to support integration of services across various architectural domains. That is, the architecture integration sub-domain defines how different applications and/or services can "talk" to each other, such as through an Enterprise Service Bus (ESB). An ESB is a software architecture construct that provides communication between different services, preferably via an event-driven and/or standards-based messaging engine (i.e., "bus"). As shown in chart 802 of FIG. 8, exemplary architecture work products and/or key SOE activities associated with the architecture integration sub-domain include, but are not limited to, conducting integration architecture assessments; reviewing/defining integration architecture requirements; maintaining system context diagrams; creating integration guiding principles, standards, and design patterns; designing ESB components; defining transaction maps; creating service specifications; defining legacy transformation services (e.g., defining how legacy systems can be conformed into an SOA environment); defining data transformation services; updating architecture decisions; and updating non-functional requirements.

Architecture Security Sub-Domain

Figure 9:
FIG. 9 depicts an exemplary architecture security sub-domain.

The architecture security sub-domain defines architecture structures, elements and/or activities needed for secure consumption and provisioning of services. As shown in chart 902 of FIG. 9, exemplary architecture work products and/or key SOE activities associated with the architecture security sub-domain include, but are not limited to, conducting security architecture assessments; reviewing/defining security architecture requirements for all architecture domains; conducting role definition and LDAP mapping; conducting LDAP definition and design; creating security architecture guiding principles and standards; creating security architecture design; conducting security architecture implementation; conducting necessary health checks; updating architecture decisions; and updating non-functional requirements.

Architecture System Sub-Domain

The architecture system sub-domain defines architecture structures, elements and/or activities needed to support operational reliability of services. That is, the architecture system sub-domain defines hardware, software, and performance standards (e.g., load balancing) needed for optimal performance of a new software architecture. As shown in chart 1002 of FIG. 10, exemplary architecture work products and/or key SOE activities associated with the architecture system sub-domain include, but are not limited to, creating an operational model; defining the (hardware and software) infrastructure; reviewing and defining network strategies; completing infrastructure portfolio assessments and requirements; creating performance plans and models; updating architecture decisions; and updating non-functional requirements.

Returning now to FIG. 1, blocks 110 and 112 describe the steps of identifying activities required in the governance domain and architecture sub-domains (block 110); and describing each of the activities for each architecture sub-domain in detail (block 112). In an exemplary embodiment, describing the activities in detail includes 1) describing what the activity will accomplish in promoting a particular business outcome; 2) explain why the activity is necessary for accomplishing that particular business outcome; and 3) measure criteria that track how the accomplishment is progressing. The charts shown in FIGS. 2-10 depict examples of these steps. For example, in FIG. 2, one of the activities is Determining Maturity Levels for SOA. The detailed description of this activity thus includes 1) determining organizational readiness for SOA; 2) deriving current and future states and activities for maturing the organization; and 3) tracking criteria to measure the accomplishment of the goal. From this information, a user is able to determine that a SIMM assessment of the client and service provider's work products needs to be performed. Thus, the three descriptors for activities causes a team to immediately identify if there is an existing work product or template from the client's existing SDLC, or if a new work product/template needs to be adopted.

From the now defined governance domain, architecture sub-domains, and their identified and described activities, the reusable framework is then transformed into a reusable Governance-Architecture Framework for a Service Oriented Enterprise (GAF-SOE) (block 114).

Referring now to block 116, owners and progress status markers for each identified marker are identified and/or created (see examples in charts shown in FIGS. 2-10).

As described in block 118, the detailed descriptors of the activities, identified owners and progress status markers found in the GAF-SOE are then mapped to a client-specific SDLC work product. That is, the information that has populated the reusable framework is then mapped onto an existing process and protocol for creating software (client-specific SDLC work product). Any "gaps" in the SDLC are then "filled in" with the details shown in the exemplary charts shown in FIGS. 2-10. Based on this framework-to-SDLC mapping, a new customer-centric SOA-based software architecture is created (block 118). By following this reusable GAF-SOE architecture framework, the customer is assured that the new SOA-based software architecture will function properly within his enterprise.

Timelines are then set for deploying the governance domain and the architecture domain in the GAF-SOE (block 122). Examples of different components and/or domains found in the new software architecture, along with their respective implementation target/due dates, are found in chart 1102 in FIG. 11.

As suggested by block 124 in FIG. 1, a project plan is then created to implement and deploy the newly defined/derived software architecture, and the process ends (terminator block 126).

Figure 12:
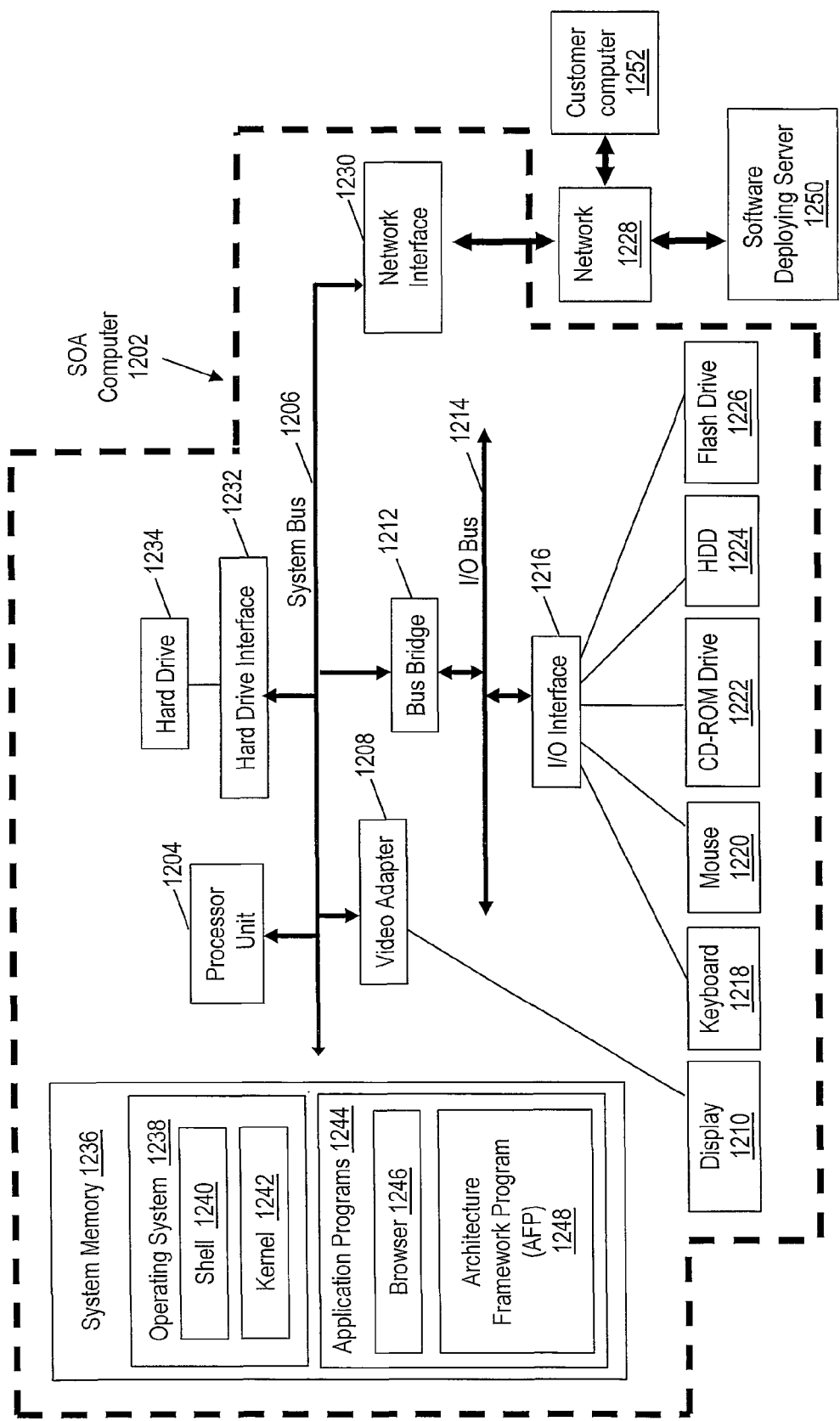
FIG. 12 illustrates an exemplary computer in which the present invention may be utilized.

With reference now to FIG. 12, there is depicted a block diagram of an exemplary SOA computer 1202, in which the present invention may be utilized. Note that some or all of the exemplary architecture shown for SOA computer 1202 may be utilized by software deploying server 1250 and/or a customer computer 1252. That is, the SOA computer 1202 may create a new software architecture utilizing the processes described above; the new software architecture may be deployed to customer computer 1252; and software deploying server 1250 may deploy software to SOA computer 1202 to perform the above describe process.

SOA computer 1202 includes a processor unit 1204 that is coupled to a system bus 1206. A video adapter 1208, which drives/supports a display 1210, is also coupled to system bus 1206. System bus 1206 is coupled via a bus bridge 1212 to an Input/Output (I/O) bus 1214. An I/O interface 1216 is coupled to I/O bus 1214. I/O interface 1216 affords communication with various I/O devices, including a keyboard 1218, a mouse 1220, a Compact Disk-Read Only Memory (CD-ROM) drive 1222, a Hard Disk Drive (HDD) 1224, and a Flash Drive 1226. The format of the ports connected to I/O interface 1216 may be any known to those skilled in the art of computer architecture, including but not limited to Universal Serial Bus (USB) ports.

SOA computer 1202 is able to communicate with a software deploying server 1250 and/or a customer computer 1252 via a network 1228 using a network interface 1230, which is coupled to system bus 1206. Network 1228 may be an external network such as the Internet, or an internal network such as an Ethernet or a Virtual Private Network (VPN).

A hard drive interface 1232 is also coupled to system bus 1206. Hard drive interface 1232 interfaces with a hard drive 1234. In a preferred embodiment, hard drive 1234 populates a system memory 1236, which is also coupled to system bus 1206. System memory is defined as a lowest level of volatile memory in SOA computer 1202. This volatile memory includes additional higher levels of volatile memory (not shown), including, but not limited to, cache memory, registers and buffers. Data that populates system memory 1236 includes computer 1202's operating system (OS) 1238 and application programs 1244.

OS 1238 includes a shell 1240, for providing transparent user access to resources such as application programs 1244. Generally, shell 1240 is a program that provides an interpreter and an interface between the user and the operating system. More specifically, shell 1240 executes commands that are entered into a command line user interface or from a file. Thus, shell 1240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1242) for processing. Note that while shell 1240 is a text-based, line-oriented user interface, the present invention will equally well support other user interface modes, such as graphical, voice, gestural, etc.

As depicted, OS 1238 also includes kernel 1242, which includes lower levels of functionality for OS 1238, including providing essential services required by other parts of OS 1238 and application programs 1244, including memory management, process and task management, disk management, and mouse and keyboard management.

Application programs 1244 include a renderer, shown in exemplary manner as a browser 1246. Browser 1246 includes program modules and instructions enabling a World Wide Web (WWW) client (i.e., SOA computer 1202) to send and receive network messages to the Internet using HyperText Transfer Protocol (HTTP) messaging, thus enabling communication with software deploying server 1250 and other described computer systems.

Application programs 1244 in computer 1202's system memory (as well as software deploying server 1250's system memory) also include an Architecture Framework Program (AFP) 1248. AFP 1248 includes code for implementing the processes described in FIGS. 1-11 and 13A-14B. In one embodiment, SOA computer 1202 is able to download AFP 1248 from software deploying server 1250.

The hardware elements depicted in computer 1202 are not intended to be exhaustive, but rather are representative to highlight essential components required by the present invention. For instance, computer 1202 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 1250 performs all of the functions associated with the present invention (including execution of AFP 1248), thus freeing SOA computer 1202 from having to use its own internal computing resources to execute AFP 1248.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of AFP 1248, are performed by service provider server 1250. Alternatively, AFP 1248 and the method described herein, and in particular as shown and described in FIGS. 1-11, can be deployed as a process software from service provider server 1250 to SOA computer 1202. Still more particularly, process software for the method so described may be deployed to service provider server 1250 by another service provider server (not shown).

Figure 13A:
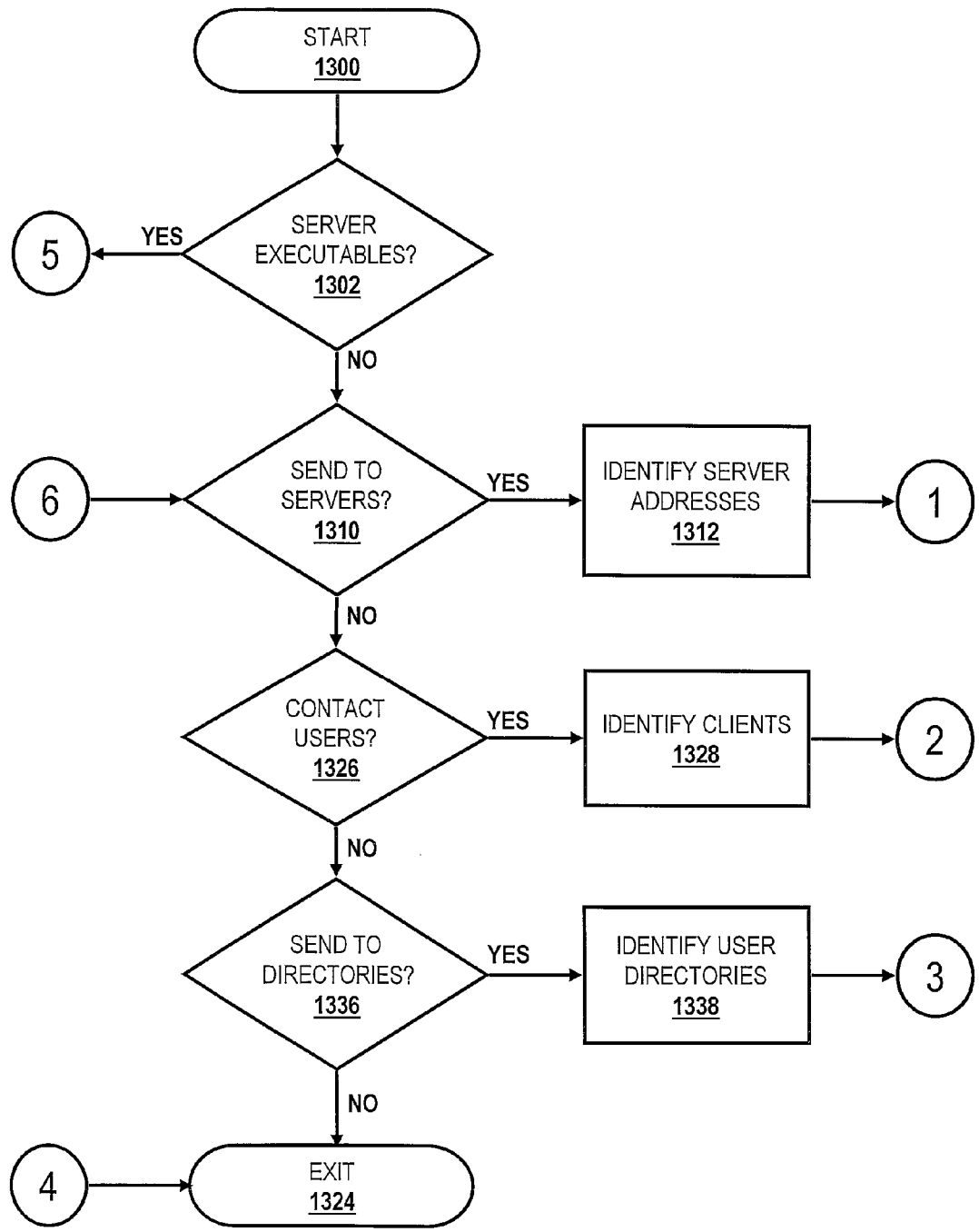
FIGS. 13A-B are flow-charts showing steps taken to deploy software capable of executing the steps described in FIGS. 1-11.
Figure 13B:
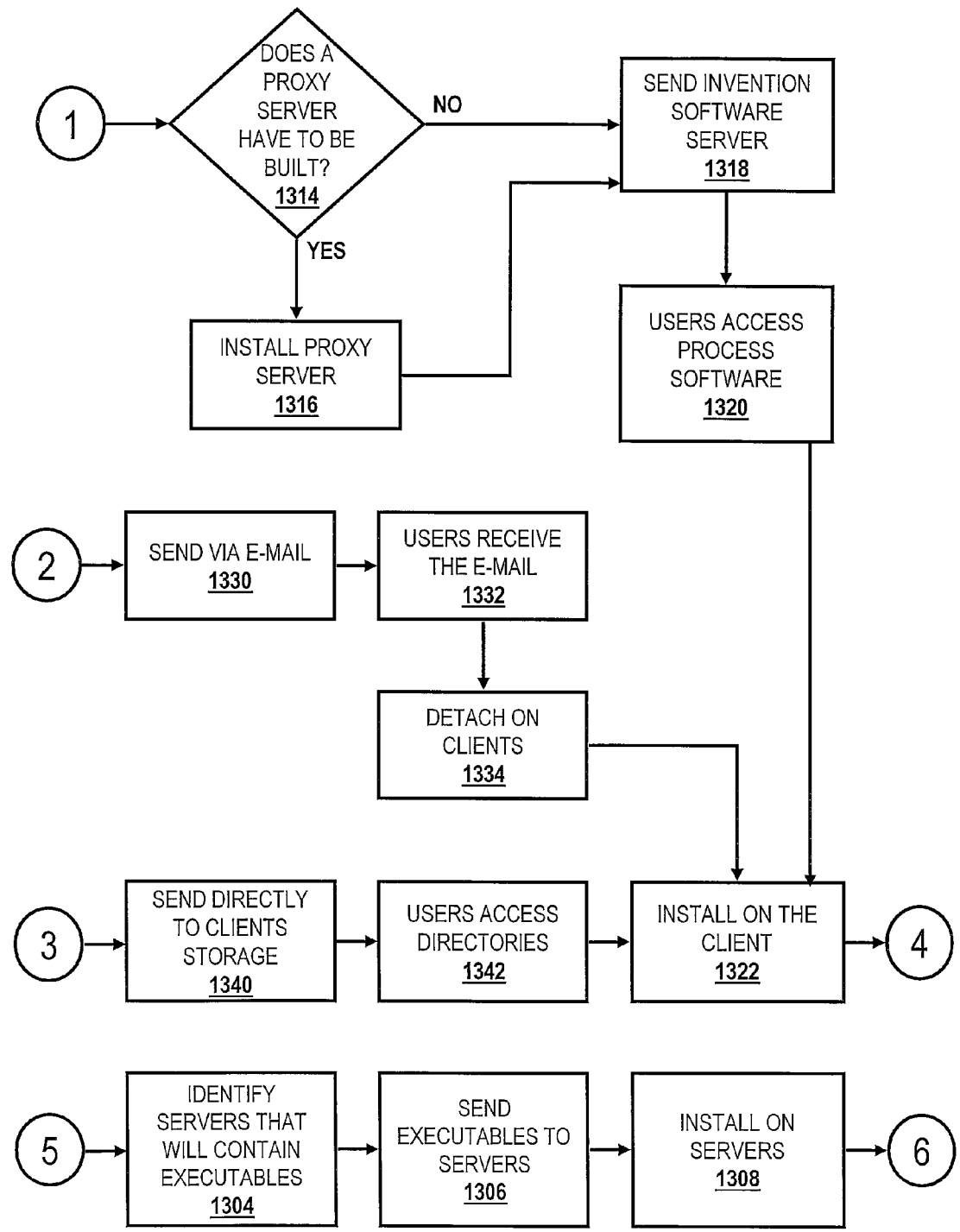

Referring then to FIGS. 13A-B, step 1300 begins the deployment of the process software. The first thing is to determine if there are any programs that will reside on a server or servers when the process software is executed (query block 1302). If this is the case, then the servers that will contain the executables are identified (block 1304). The process software for the server or servers is transferred directly to the servers' storage via File Transfer Protocol (FTP) or some other protocol or by copying though the use of a shared file system (block 1306). The process software is then installed on the servers (block 1308).

Next, a determination is made on whether the process software is to be deployed by having users access the process software on a server or servers (query block 1310). If the users are to access the process software on servers, then the server addresses that will store the process software are identified (block 1312).

A determination is made if a proxy server is to be built (query block 1314) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 1316). The process software is sent to the servers either via a protocol such as FTP or it is copied directly from the source files to the server files via file sharing (block 1318). Another embodiment would be to send a transaction to the servers that contained the process software and have the server process the transaction, then receive and copy the process software to the server's file system. Once the process software is stored at the servers, the users, via their computers, then access the process software on the servers and copy to their computers file systems (block 1320). Another embodiment is to have the servers automatically copy the process software to each client and then run the installation program for the process software at each computer. The user executes the program that installs the process software on his computer (block 1322) then exits the process (terminator block 1324).

In query step 1326, a determination is made whether the process software is to be deployed by sending the process software to users via e-mail. The set of users where the process software will be deployed are identified together with the addresses of the user computers (block 1328). The process software is sent via e-mail to each of the users' computers (block 1330). The users then receive the e-mail (block 1332) and then detach the process software from the e-mail to a directory on their computers (block 1334). The user executes the program that installs the process software on his computer (block 1322) then exits the process (terminator block 1324).

Lastly a determination is made as to whether the process software will be sent directly to user directories on their computers (query block 1336). If so, the user directories are identified (block 1338). The process software is transferred directly to the user's computer directory (block 1340). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1342). The user executes the program that installs the process software on his computer (block 1322) and then exits the process (terminator block 1324).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 14A:
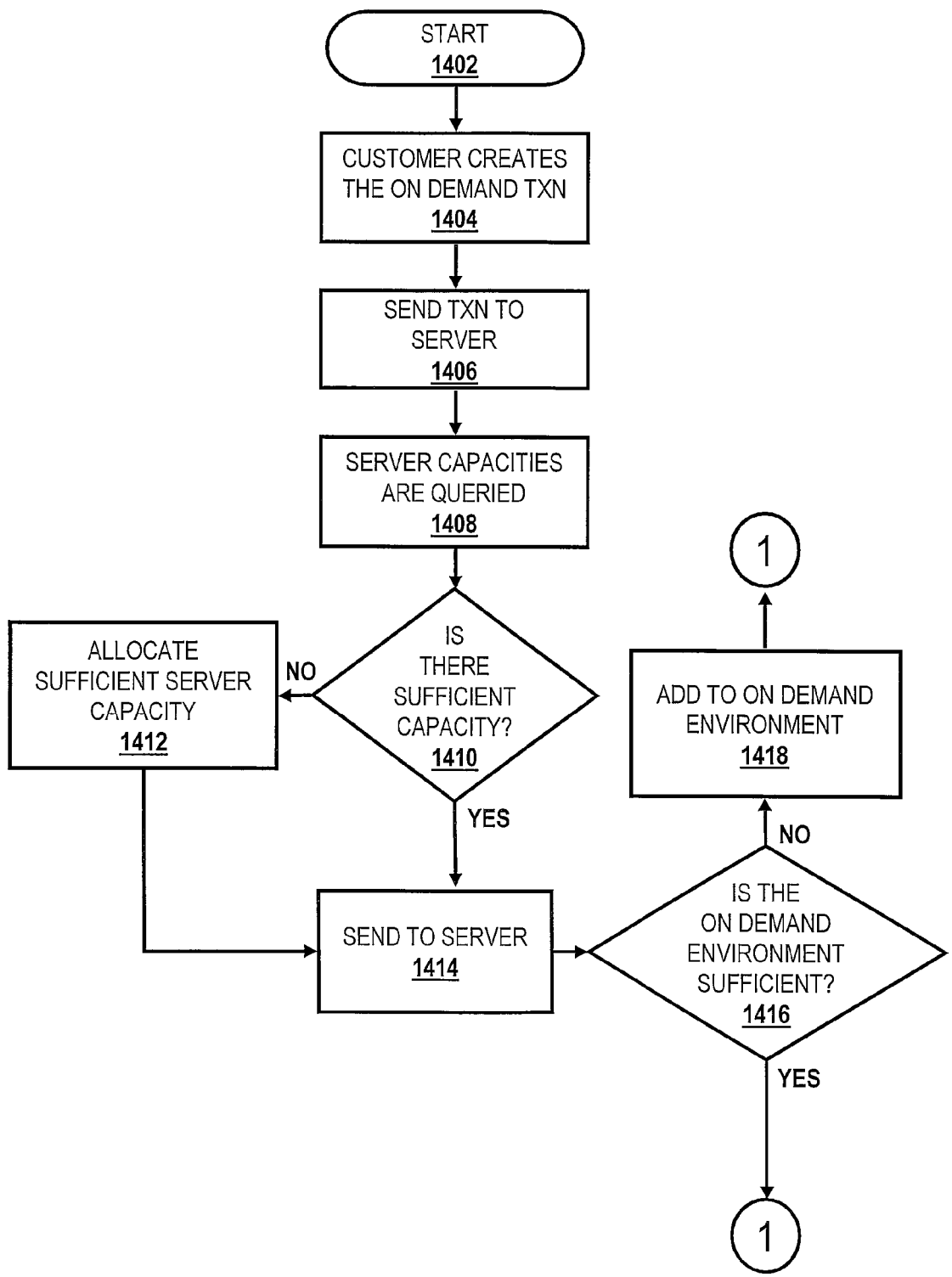
FIGS. 14A-B are flow-charts showing steps taken to execute the steps shown in FIGS. 1-11 using an on-demand service provider.
Figure 14B:
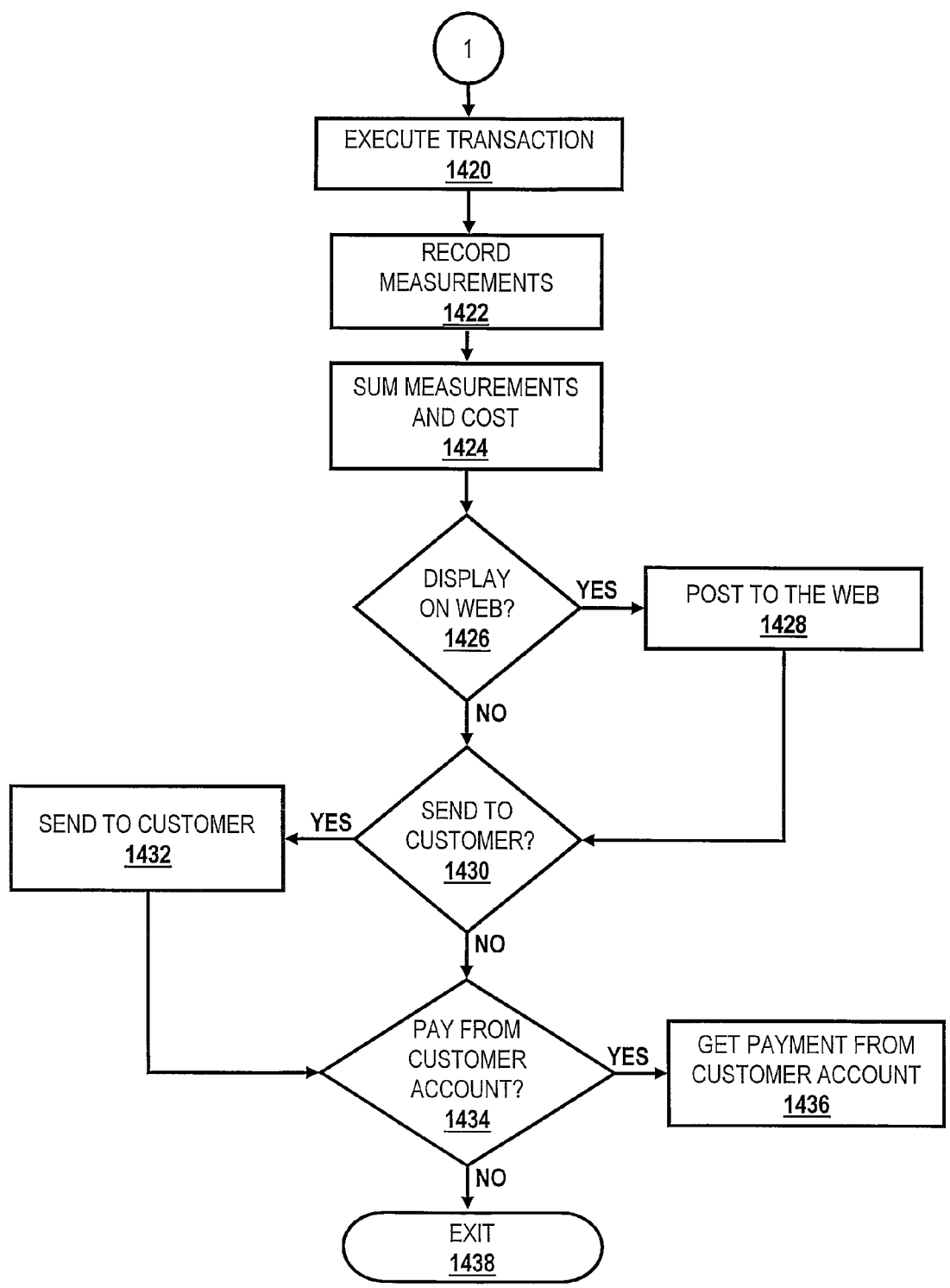

With reference now to FIGS. 14A-B, initiator block 1402 begins the On Demand process. A transaction is created than contains the unique customer identification, the requested service type and any service parameters that further specify the type of service (block 1404). The transaction is then sent to the main server (block 1406). In an On Demand environment the main server can initially be the only server, then as capacity is consumed other servers are added to the On Demand environment.

The server central processing unit (CPU) capacities in the On Demand environment are queried (block 1408). The CPU requirement of the transaction is estimated, then the server's available CPU capacity in the On Demand environment are compared to the transaction CPU requirement to see if there is sufficient CPU available capacity in any server to process the transaction (query block 1410). If there is not sufficient server CPU available capacity, then additional server CPU capacity is allocated to process the transaction (block 1412). If there was already sufficient available CPU capacity then the transaction is sent to a selected server (block 1414).

Before executing the transaction, a check is made of the remaining On Demand environment to determine if the environment has sufficient available capacity for processing the transaction. This environment capacity consists of such things as, but not limited to, network bandwidth, processor memory, storage etc. (block 1416). If there is not sufficient available capacity, then capacity will be added to the On Demand environment (block 1418). Next the required software to process the transaction is accessed, loaded into memory, then the transaction is executed (block 1420).

The usage measurements are recorded (block 1422). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1424).

If the customer has requested that the On Demand costs be posted to a web site (query block 1426), then they are posted (block 1428). If the customer has requested that the On Demand costs be sent via e-mail to a customer address (query block 1430), then these costs are sent to the customer (block 1432). If the customer has requested that the On Demand costs be paid directly from a customer account (query block 1434), then payment is received directly from the customer account (block 1436). The On Demand process is then exited at terminator block 1438.

The presently disclosed invention thus provides a method and apparatus for creating a governance framework for architecture design, integration and project planning for solutions that will reside within a service oriented enterprise ("Governance/Architecture Framework-Service Oriented Enterprise (GAF-SOE)). The invention addresses a long felt need for use in projects in which client teams wanted to migrate to a Service Oriented Architecture (SOA) environment, but did not have a governance framework for ensuring that essential components and work activities were identified and integrated appropriately. Such client teams often took pride in their Systems Development Life Cycle (SDLC), which described the basic start-up, requirement determination, design and implementation steps for creating a software architecture. However, such SDLC's were unable to provide templates and work products for producing service oriented solutions for the enterprise.

Without the GAF-SOE described herein, project teams had a difficult time determining what work needed to be done and how to work together to build out service oriented enterprise solutions; different departments ended up working on various components independently; there was no common delivery framework in place for reuse; and by the time the players united, unnecessary time was required to integrate solutions.

Note further that another advantage of the present invention over the prior art is the described steps for creating a reusable governance framework for a software architecture design in a service oriented enterprise. The present invention creates guidelines for preparing a framework, and then shows how this framework is implemented in a real-life customer setting. Furthermore, the present invention uniquely links architecture domains for service oriented integration for the enterprise (e.g., Architecture Application Sub-Domain in FIG. 5a has an activity to Prepare ESB Requirements and High Level Design while the Architecture Data Sub-Domain in FIG. 7 identifies a key activity—Participate in ESB Design Reviews, and FIG. 8 contains an activity to Conduct ESB Component Design. Note also that the present invention provides a framework for both information and data architecture sub-domains.

Thus, as described herein, the present invention provides a governance framework for architecture design that shows how to integrate components that will reside within a service oriented enterprise as well as how to map key activities to client specific deliverables. The present invention identifies and bridges together the key components and resources necessary to build an end-to-end solution and ensures that all aspects of the enterprise architecture are addressed. This invention has been proven to accelerate architecture design, development and deployment for reuse while promoting collaboration between service providers and client delivery teams. It was created and collaboration between service providers and client delivery teams. It was created and successfully applied on a SOA governance project where a two-year roadmap and project plan is now being implemented. This invention was essential in helping client teams identify gaps in their systems life cycle processes and provide a strategic yet tactful opportunity for IBM to offer support of delivery initiatives by providing work products and resources while at the same time providing thought leadership to clients for advancing their SDLC to support Service Oriented Enterprise development and implementation activities.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for utilizing a reusable framework when creating a software architecture in a Service Oriented Architecture (SOA), the method comprising:
creating a reusable framework for an SOA-based software architecture;
dividing the reusable framework into a governance domain and an architecture domain, wherein the governance domain defines principals and policies for designing and implementing the SOA-based software architecture, and wherein the architecture domain describes specific elements and requirements for the SOA-based software architecture;
subdividing the architecture domain into multiple architecture sub-domains;
identifying activities required for the governance domain and each of the architecture sub-domains;
describing each of the activities in detail;
incorporating the governance domain, the architecture sub-domains, and identified and described activities into the reusable framework to create a reusable Governance/Architecture Framework for a Service Oriented Enterprise (GAF-SOE);
identifying owners and progress status markers for each of the activities that have been identified and described in detail in the GAF-SOE;
mapping detailed descriptors of the activities, identified owners and progress status markers in the GAF-SOE to a client-specific System Development Life Cycle (SDLC) work product;
a processor of a computer creating the SOA-based software architecture based on the detailed descriptors that have been mapped to the client-specific SDLC work product for the GAF-SOE;
determining deployment timelines for the governance domain and the architecture domain in the GAF-SOE; and
creating a project plan for deploying the SOA-based software architecture based on the deployment timelines.

2. The method of claim 1, wherein the architecture sub-domains comprise an architecture governance sub-domain, and wherein the architecture governance sub-domain describes principles, policies and guidelines for the SOA-based software architecture.

3. The method of claim 2, wherein the principles are based on geographic global legal requirements for the SOA-based software architecture, the policies are based on security requirements for the SOA-based software architecture, and the guidelines are based on security requirements for a specific project that is utilizing the SOA-based software architecture.

4. The method of claim 1, wherein the architecture sub-domains comprise an architecture presentation sub-domain, wherein the architecture presentation sub-domain defines what type of user interface is required for the SOA-based software architecture.

5. The method of claim 1, wherein the architecture sub-domains comprise an architecture business sub-domain, wherein the architecture business sub-domain identifies and captures business processes that are performed by the SOA-based software architecture.

6. The method of claim 1, wherein the architecture sub-domains comprise an architecture application sub-domain, wherein the architecture application sub-domain identifies specific software applications that are required by the SOA-based software architecture.

7. The method of claim 1, wherein the architecture sub-domains comprise an architecture information sub-domain, wherein the architecture information sub-domain identifies what type of information is relevant to the SOA-based software architecture.

8. The method of claim 1, wherein the architecture sub-domains comprise an architecture data sub-domain, wherein the architecture data sub-domain defines what format data must be in to be utilized by the SOA-based software architecture.

9. The method of claim 1, wherein the architecture sub-domains comprise an architecture integration sub-domain, wherein the architecture integration sub-domain identifies what type of interfaces are required to permit different services within the SOA-based software architecture to communicate with one another.

10. The method of claim 1, wherein the architecture sub-domains comprise an architecture security sub-domain, wherein the architecture security sub-domain identifies what type of software security is required by the SOA-based software architecture.

11. The method of claim 1, wherein the architecture sub-domains comprise an architecture system sub-domain, wherein the architecture system sub-domain defines hardware performance requirements of the SOA-based software architecture.

12. The method of claim 11, wherein the hardware performance requirements are based on load balancing of work.

13. The method of claim 1, wherein describing each of the activities in detail further comprises:
describing what a particular activity will accomplish in promoting a particular business outcome;
explaining why the particular activity is necessary for accomplishing the particular business outcome; and
measuring criteria that track how accomplishment of the particular business outcome is progressing.

14. A system comprising:
a processor;
a data bus coupled to the processor;
a memory coupled to the data bus; and
a computer-usable medium embodying computer program code, the computer program code comprising instructions executable by the processor and configured for creating a software architecture in a Service Oriented Architecture (SOA) by performing the steps of:
creating a reusable framework for an SOA-based software architecture;
dividing the reusable framework into a governance domain and an architecture domain, wherein the governance domain defines principals and policies for designing and implementing the SOA-based software architecture, and wherein the architecture domain describes specific elements and requirements for the SOA-based software architecture;
subdividing the architecture domain into multiple architecture sub-domains;
identifying activities required for the governance domain and each of the architecture sub-domains;
describing each of the activities in detail;
identifying owners and progress status markers for each of the activities that have been identified and described in detail;

mapping detailed descriptors of the activities, identified owners and progress status markers to a client-specific System Development Life Cycle (SDLC) work product;

creating the SOA-based software architecture based on the detailed descriptors that have been mapped to the client-specific SDLC work product;

determining deployment timelines for the governance domain and the architecture domain; and creating a project plan for deploying the SOA-based software architecture based on the deployment timelines.

15. A tangible computer-readable storage medium embodying computer program code, the computer program code comprising instructions executable by the processor and configured for creating a software architecture in a Service Oriented Architecture (SOA) by performing the steps of:

creating a reusable framework for an SOA-based software architecture;

dividing the reusable framework into a governance domain and an architecture domain, wherein the governance domain defines principals and policies for designing and implementing the SOA-based software architecture, and wherein the architecture domain describes specific elements and requirements for the SOA-based software architecture;

subdividing the architecture domain into multiple architecture sub-domains; and identifying activities required for the governance domain and each of the architecture sub-domains.

16. The tangible computer-readable storage medium of claim 15, wherein the instructions are further configured for:

describing each of the activities in detail;

identifying owners and progress status markers for each of the activities that have been identified and described in detail;

mapping detailed descriptors of the activities, identified owners and progress status markers to a client-specific System Development Life Cycle (SDLC) work product; and creating the SOA-based software architecture based on the detailed descriptors that have been mapped to the client-specific SDLC work product.

17. The tangible computer-readable storage medium of claim 16, wherein the instructions are further configured for:

determining deployment timelines for the governance domain and the architecture domain; and creating a project plan for deploying the SOA-based software architecture based on the deployment timelines.

18. The tangible computer-readable storage medium of claim 17, wherein the architecture sub-domains comprise an architecture governance sub-domain, and wherein the architecture governance sub-domain describes principles, policies and guidelines for the SOA-based software architecture.

19. The tangible computer-readable storage medium of claim 15, wherein the computer-usable medium is a component of a remote server, and wherein the computer executable instructions are deployable to a Service Oriented Architecture (SOA) computer from the remote server.

20. The tangible computer-readable storage medium of claim 15, wherein the computer executable instructions are capable of being provided by a service provider to a customer on an on-demand basis.

* * * * *